(12) United States Patent
Imai (10) Patent No.: US 9,829,954 B2
(45) Date of Patent: Nov. 28, 2017

(54) AUTONOMOUS DISTRIBUTED CACHE ALLOCATION CONTROL SYSTEM

(71) Applicant: FUJITSU LIMITED, Kawasaki-shi, Kanagawa (JP)

(72) Inventor: Satoshi Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 240 days.

(21) Appl. No.: 14/181,708

(22) Filed: Feb. 16, 2014

(65) Prior Publication Data

US 2014/0289355 A1    Sep. 25, 2014

(30) Foreign Application Priority Data

Mar. 21, 2013 (JP) ................................ 2013-058787

(51) Int. Cl.
G06F 15/16 (2006.01)
G06F 1/32 (2006.01)
H04L 29/08 (2006.01)

(52) U.S. Cl.
CPC .......... *G06F 1/3225* (2013.01); *G06F 1/3275* (2013.01); *H04L 29/08* (2013.01); *Y02B 60/1225* (2013.01); *Y02B 60/1228* (2013.01)

(58) Field of Classification Search
CPC ............... H04L 29/08072; H04L 29/06; H04L 29/08549
See application file for complete search history.

(56) References Cited

U.S. PATENT DOCUMENTS

| | | | | |
|---|---|---|---|---|
| 7,774,486 B2* | 8/2010 | Clarke | ................... | H04L 29/06 370/395.52 |
| 7,904,562 B2* | 3/2011 | Takase | ................... | H04L 47/10 709/226 |
| 2003/0236885 A1 | 12/2003 | Takeuchi et al. | | |

(Continued)

FOREIGN PATENT DOCUMENTS

| | | |
|---|---|---|
| JP | 2003-122658 | 4/2003 |
| JP | 2003-280975 | 10/2003 |

(Continued)

OTHER PUBLICATIONS

Lee et al. Toward Energy-Efficient Content Dissemination. Mar. 2011 IEEE.*

(Continued)

*Primary Examiner* — Bryan Lee
(74) *Attorney, Agent, or Firm* — Fujitsu Patent Center (57) ABSTRACT

A node includes a processor that is configured to derive, based on a delivery tree for a content, a logical sub tree structure including a first layer node and second layer nodes lower than the first layer node; calculate first electric power information used for caching the content in the first layer node in the sub tree structure; compare the first electric power information to second electric power information calculated by the second layer nodes in the sub tree structure and used for caching the content in the second layer nodes, then calculate a threshold for a content request rate for each of the second layer nodes; provide control to set the calculated threshold to the second layer nodes; and determine possibility of a cache allocation of the content by comparing a measured content request rate with the threshold.

6 Claims, 12 Drawing Sheets

(56) References Cited

U.S. PATENT DOCUMENTS

| | | | | |
|---|---|---|---|---|
| 2006/0112376 A1* | 5/2006 | Broberg | .................... | G06F 8/20 |
| | | | | 717/136 |
| 2008/0263637 A1* | 10/2008 | Nonaka | ................... | G06F 21/10 |
| | | | | 726/4 |
| 2010/0114682 A1* | 5/2010 | Bosco | .................... | G06Q 30/02 |
| | | | | 705/14.6 |
| 2012/0076052 A1* | 3/2012 | Kling | ..................... | H04L 41/12 |
| | | | | 370/256 |
| 2012/0158884 A1* | 6/2012 | Hatano | ............ | H04N 21/23106 |
| | | | | 709/213 |
| 2012/0170432 A1* | 7/2012 | Hershey | ............... | G11B 7/0065 |
| | | | | 369/47.5 |
| 2013/0007186 A1* | 1/2013 | Liu | ..................... | H04L 67/1008 |
| | | | | 709/213 |
| 2013/0314605 A1* | 11/2013 | Minemura | ................ | H04N 5/38 |
| | | | | 348/723 |
| 2013/0315257 A1* | 11/2013 | Welin | ..................... | H04L 45/12 |
| | | | | 370/401 |
| 2014/0164308 A1* | 6/2014 | Verhoeyen | ........ | H04L 29/08729 |
| | | | | 706/46 |

FOREIGN PATENT DOCUMENTS

| | | |
|---|---|---|
| JP | 2005-031987 | 2/2005 |
| JP | 2011-176595 | 9/2011 |

OTHER PUBLICATIONS

LEe et al. Greening the Internet with Content-Centric Networking. Apr. 2010 ACM. Passu Germany.*
Imai et al., "Energy Efficient Content Locations for In-Network Caching", IEEE, pp. 554-559 (2012).

* cited by examiner

PROCESSING FOR ONE DELIVERY TREE

| Device | Product | Spec | Power | Power Density |
|---|---|---|---|---|
| DRAM | – | 4GB | 10W | $P_{ca} = 2.5 \times 10^{-9}$ W/byte |
| Core Router | CRS-1 | 320Gbps | 4185W | $P_r = 1.3 \times 10^{-8}$ W/bps |
| WDM | FLASHWAVE9500 | 480Gbps | 800W | $P_{wdm} = 1.67 \times 10^{-9}$ W/bps |

AUTONOMOUS DISTRIBUTED CACHE ALLOCATION CONTROL SYSTEM

CROSS-REFERENCE TO RELATED APPLICATION

This application is based upon and claims the benefit of priority of the prior Japanese Patent Application No. JP2013-058787, filed on Mar. 21, 2013, the entire contents of which are incorporated herein by reference.

FIELD

The disclosures made herein relate to an autonomous distributed cache allocation control system.

BACKGROUND

Hitherto, an electric power saving network technology that reduces an electric power or an electric energy consumed by network apparatus by reducing a traffic amount on a network is known.

The traffic amount is represented by, for example, a throughput, namely a packet transfer amount (number of packets per unit time, packet per second (PPS)). Moreover, the electric energy is acquired as a total amount of accumulated products of electric power and time (watt second (W·sec) or Joule (J)). Note that, the electric power is simply used unless specific restriction is necessary in the disclosure of the specification.

As an example of the electric power saving network technology, there is such a network system that replicas of a content are arranged on a plurality of servers connected to a core network or a metro network, and the content is delivered from a server geographically close to a client apparatus used by a user. The electric power consumed by the network apparatus can be reduced by reducing the traffic amount passing through the network in this system.

A technology that caches the replicas of a content can reduce the traffic amount processed in the network by caching more contents on a server or a node close to the client apparatus used by the user, resulting in more reduction in network apparatus deployment and electric power consumption. However, the caching of a large number of contents generates the electric power consumption and a cost accompanied by the memory use and the apparatus deployment. Therefore, it is necessary to take into consideration a correlation between the reduction in the electric power and the apparatus deployment as a result of the reduction in traffic amount, and the increase in the electric power and the cost accompanied by the content caching.

In recent years, attention has been paid on the content centric networking (CCN) technology that adds a cache functionality to nodes which construct a network, thereby alleviating a restriction on a cache allocation of contents. In a network to which the CCN technology is applied, replicas of a content are cached on nodes constructing a core network or a metro network. Then, a traffic amount flowing into the network can be reduced by delivering the content cached on the node, thereby reducing an electric power consumed by network apparatus and the apparatus deployment cost.

The following are related arts to the invention.

[Patent document 1] Japanese Patent Laid-Open Publication No. JP 2003-122658
[Patent document 2] Japanese Patent Laid-Open Publication No. JP 2003-280975
[Patent document 3] Japanese Patent Laid-Open Publication No. JP 2005-031987
[Patent document 4] Japanese Patent Laid-Open Publication No. JP 2011-176595
[Non-patent document 1] Energy Efficient Content Locations for In-Network Caching, Satoshi Imai, Kenji Leibnitz, Masayuki Murata, in proceeding of 18th Asia-Pacific Conference on Communications—APCC 2012, at Jeju Korea

SUMMARY

The Non-patent document 1 discloses a method of identifying cache allocation locations which provide the largest electric power saving by taking into consideration an electric power accompanied by cache allocation (content cache) and an electric power accompanied by a traffic transmission (content delivery) by means of a content list of all contents and a request distribution (popularity).

This method designs optimal cache allocation locations for each content assuming that a request distribution list for the content can be centrally managed, and caches the each content only at specified nodes.

Figure 1:
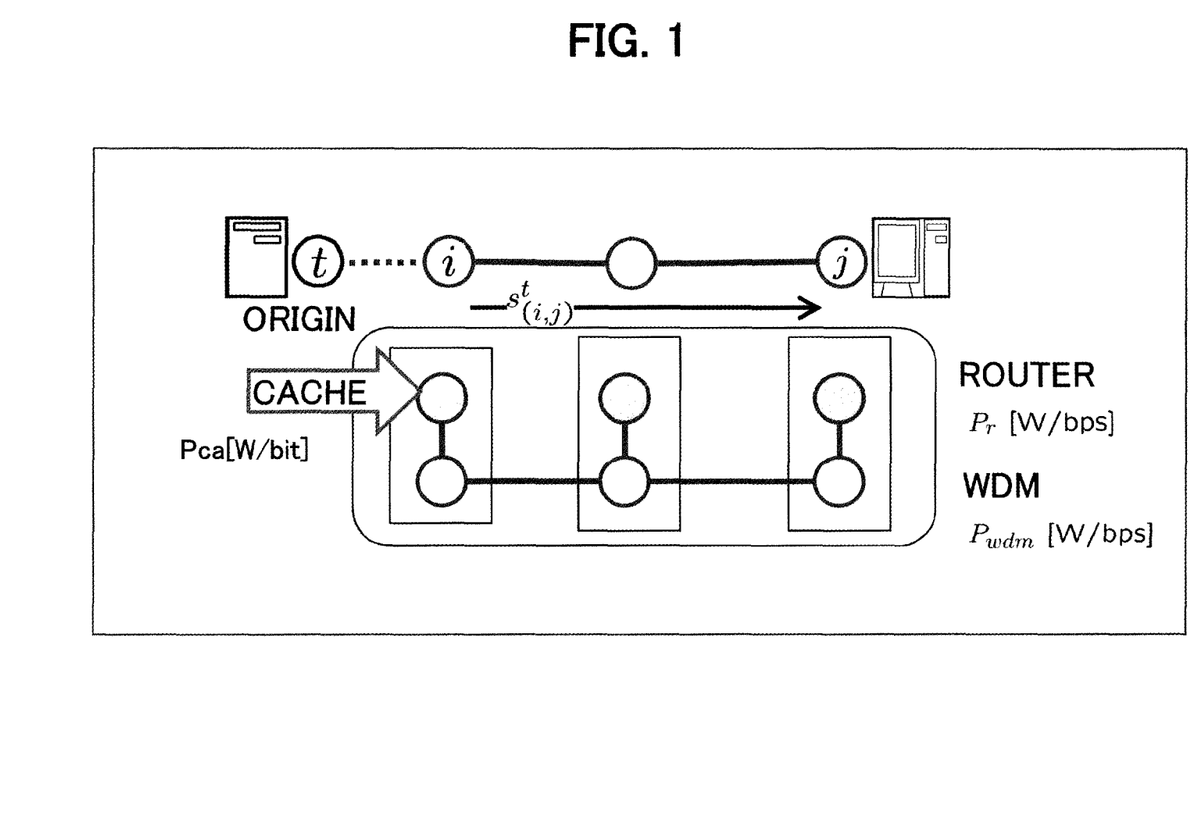
FIG. 1 is a diagram illustrating a cache allocation design method according to the related art.

As illustrated in FIG. 1, a traffic transfer (transmission) electric power [watt, W=Joule, J/sec] for a case where content data is transferred (transmitted) on a path selected in advance in this cache allocation design method is defined by using a path variable:

$$s_{(i,j)}^{t} \in \{0, 1\}$$

as $$Tr_{k,(i,j)} = D \cdot R_{k,j} \cdot (P_r + P_{wdm}) \cdot H(s_{(i,j)}^{t})$$

where D is a content data size [bits], $R_{k,j}$ is the number of requests per unit time [requests/sec] for a content k from a site j, $H(s_{(i,j)}^{t})$ is a path length for the path variable $s_{(i,j)}^{t}$, and Pr and Pwdm are electric power parameters [W/bps=J/bit] of respectively a router and a wavelength division multiplexing (WDM) device required for transferring content data of 1 bit.

Moreover, a cache allocation electric power [watt, W=Joule, J/sec] is given by using a cache allocation variable:

$$u_i \in \{0, 1\}$$

as $$Ca_i = 1 \cdot D \cdot P_{ca}$$

where Pca is an electric power parameter [W/bit=J/bit·sec] accompanied by caching content data of 1 bit.

Then, this is such a mechanism that the electric power (cost) is minimized by configuring the following objective function given by a sum of the cache allocation electric power and the traffic transfer electric power to satisfy a hierarchical constraint unique to the CCN.

$$\text{Minimize} \sum_{i \in V} \{Ca_{k,i} \cdot u_i\} + \sum_{(i,j) \in E} \{Tr_{k,(i,j)} \cdot s_{(i,j)}^{t}\}$$

However, if a mechanism such as the CCN, which assumes presence of various content providers and delivers contents in the autonomous distributed manner, is considered, the content list of all contents and the request distribution cannot be practically recognized. Moreover, even if the content list of all contents is acquired, for a large-scale network, it is difficult for the above-mentioned cache allocation design method to derive the optimal cache locations.

In other words, for the above-mentioned environment difficult in management of the cache locations by means of the centralized management method, appropriate cache locations need to be controlled by the autonomous distributed processing by the nodes in consideration of both the electric power accompanied by the cache allocation and the traffic transfer electric power accompanied by content delivery.

According to an aspect of the disclosures made herein, a node, which constructs an electric power saving network and has a cache functionality, includes a processor that is configured to derive, based on a delivery tree for a content, a logical sub tree structure including a first layer node and second layer nodes lower than the first layer node; calculate first electric power information used for caching the content in the first layer node in the sub tree structure; compare the first electric power information to second electric power information calculated by the second layer nodes in the sub tree structure and used for caching the content in the second layer nodes, then calculate a threshold for a content request rate for each of the second layer nodes; set the calculated threshold to the second layer nodes; and determine possibility of a cache allocation of the content by comparing a measured content request rate with the threshold.

Objects and advantages of the disclosures will be realized and attained by means of the elements and combinations particularly pointed out in the claims.

DESCRIPTION OF EMBODIMENTS

The embodiment of the disclosures made herein will be described below referring to the drawings in detail. The drawings illustrate a preferred embodiment. It should be understood, however, that the embodiment can be implemented by many different embodiments, and is not limited to the embodiment described herein.

[Autonomous Distributed Cache Allocation Control System]

Figure 2:
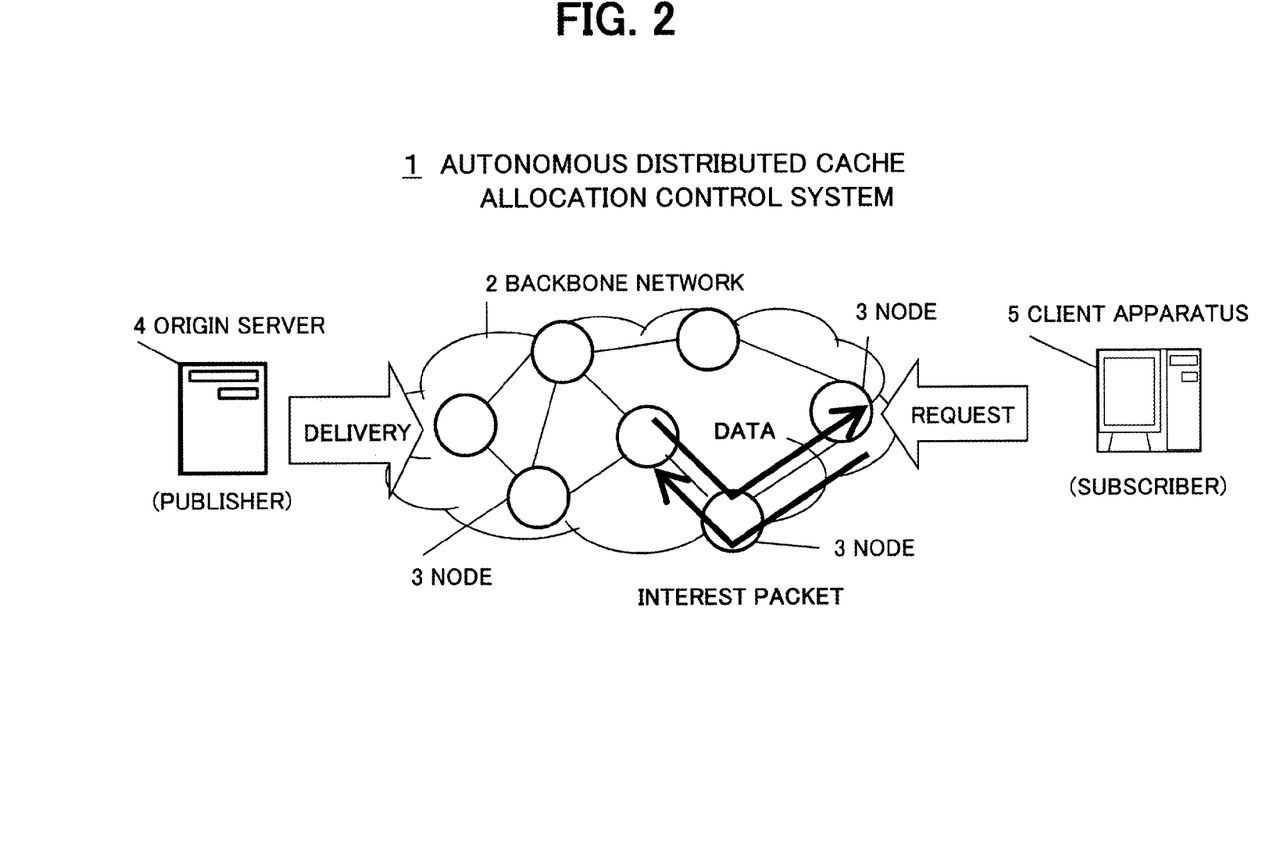
FIG. 2 is a block diagram illustrating a configuration of an autonomous distributed cache allocation control system according to an embodiment.

Referring to FIG. 2 illustrating a system configuration according to an embodiment, the content centric networking (CCN), which is a cache allocation technology of a next generation network architecture, can be applied to an autonomous distributed cache allocation control system 1.

The cache allocation control system 1 includes a plurality of nodes 3 constructing a backbone network 2 such as a core network or a metro network, and an origin server 4 connected to the backbone network 2, and operated by a creator or a publisher of contents of an origin site.

Moreover, the cache allocation control system 1 further includes a client apparatus 5 accommodated in an access network (not shown) connected to the backbone network 2. The client apparatus 5 is used by a user (subscriber). On this occasion, one origin server 4 and one client apparatus 5 are illustrated, but a plurality thereof actually exist.

Each of the nodes 3 is specifically a communication node including a router and a WDM device, but is sometimes referred to as a cache node.

In the cache allocation control system 1, the plurality of distributed nodes 3 autonomously carry out appropriate cache allocation control in order to reduce the electric power consumption in the backbone network 2. The cache allocation control system 1 can be considered as a mechanism to reduce not only the electric power consumption but also the apparatus deployment cost, and the electric power is thus equivalent to the cost.

[Node]

Figure 3:
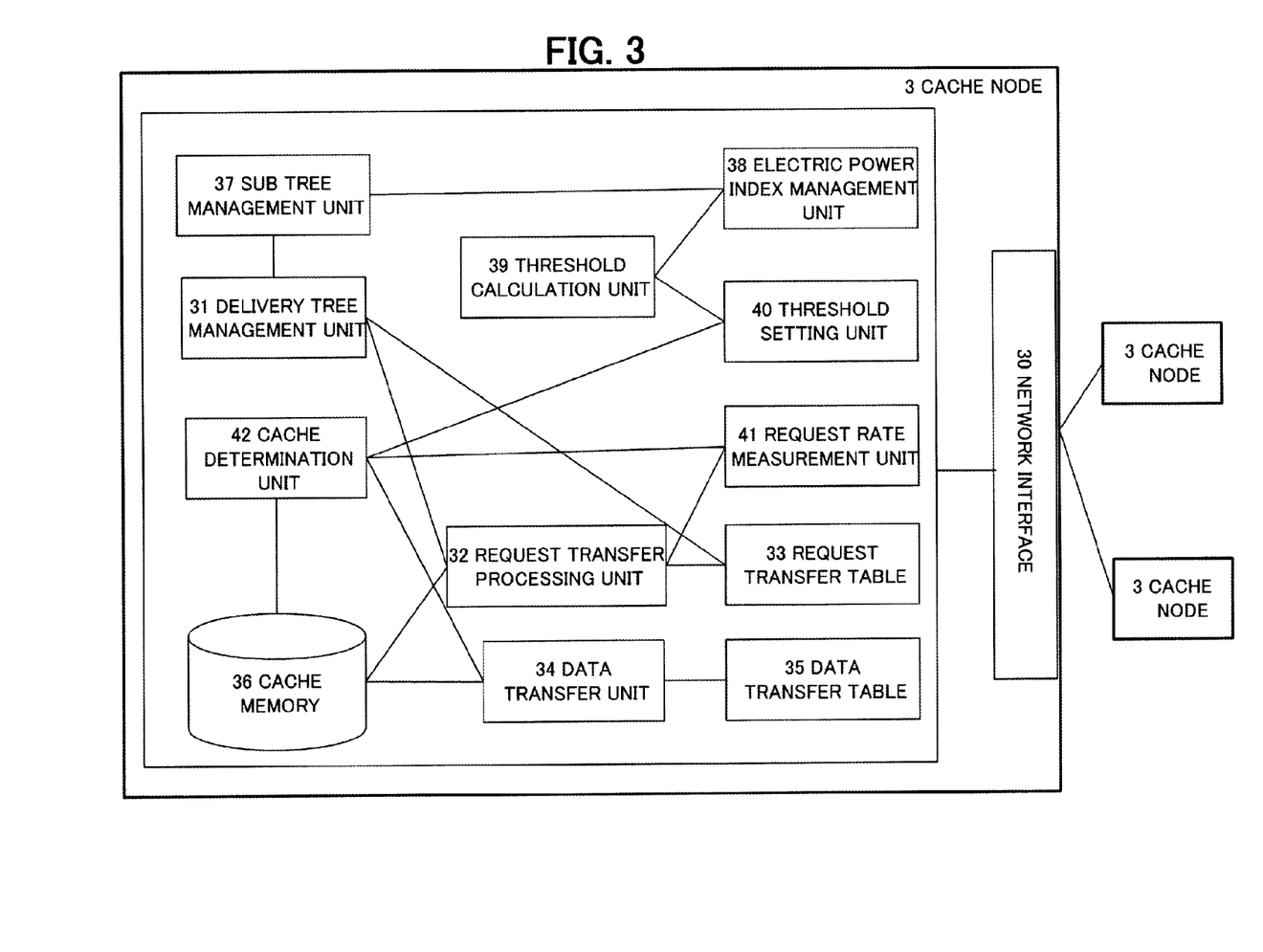
FIG. 3 is a block diagram illustrating a configuration of a cache node according to the embodiment.

FIG. 3 illustrates a configuration of the node 3 in the autonomous distributed cache allocation control system 1 according to the embodiment illustrated in FIG. 2.

The cache node 3 includes the following elements as hardware configurations. In other words, the cache node 3 includes a central processing unit (CPU) as a processor, a random access memory (RAM) as a work memory, a read only memory (ROM) which stores a boot program for booting, a disk serving as a nonvolatile flash memory which stores, in a rewritable manner, an operating system (OS), various application programs, and various types of information (including data), and a network interface card (NIC) as a communication interface. These hardware configurations are readily understood and can be embodied by a person skilled in the art, and thus the configurations are not illustrated herein.

A control program is installed in advance as an application program on the disk in the cache node 3 in order to logically realize processing functions before and during the operation, which are detailed later. Then, the CPU deploys and executes the control program on the RAM in the cache node 3.

The cache node 3 includes a network interface 30 that can be realized by the NIC. Moreover, the cache node 3 includes a delivery tree management unit 31, a request transfer processing unit 32, a request transfer table 33, a data transfer unit 34, a data transfer table 35, and a cache memory 36 as functional components. The request transfer table 33, the data transfer table 35, and the cache memory 36 can be realized by the disk.

Further, the cache node 3 includes a sub tree management unit 37, an electric power index management unit 38, a threshold calculation unit 39, a threshold setting unit 40, a request rate measurement unit 41, and a cache determination unit 42 as functional components. These components in the cache node 3 are detailed later.

[Operation]

Referring to FIGS. 2 and 3, and related diagrams, a description is now given of a processing example in the autonomous distributed cache allocation control system 1 according to the embodiment.

When the CCN technology is applied to the autonomous distributed cache allocation control system 1, processing before the operation and processing during the operation on the cache node 3 have the following processing contents.

Content Delivery Processing before Operation:

A creator or a publisher of a content delivers content information from the origin server 4 to the backbone network (sometimes simply referred to as network) 2.

On each cache node 3, the delivery tree management unit 31 builds (creates), when receiving the delivered content information, a delivery tree whose root is each origin site serving as a publishing site of each content.

Further, the request transfer processing unit 32 creates the request transfer table 33 for tracing back the delivery tree in order to build a path to search for the advertised content.

Content Search/Finding Processing during Operation:

The request transfer processing unit 32 transfers, when a content request (specifically, Interest Packet) from the client apparatus 5 used by a user rises (arrives) at each cache node 3, the content request to a next node by referring to the request transfer table 33 until the content request reaches a cache node 3 caching the content.

Moreover, the cache node 3 which has received the content request registers a location of the network interface 30, namely a physical port number or the like, which has received the content request, to the data transfer table 35.

Further, when the requested content is found on the cache memory 36 of a specific cache node 3, the data transfer unit 34 refers to the data transfer table 35 to deliver data on the content in a direction opposite to the path through which the content request has routed.

Data Accumulation Processing during Operation:

In a cache node 3 which has transferred the data of the content, the data transfer unit 34 caches the data in the cache memory 36 by means of a method such as the least frequently used (LFU).

However, the processing before the operation and the processing during the operation described above cache the content data on all cache nodes 3 through which the content data routes, and hence the cache allocation considering the electric power accompanied by the cache allocation and the traffic transfer electric power accompanied by the content delivery cannot be carried out in the network 2.

Thus, the following processing in addition to the processing before the operation and the processing during the operation is carried out on the cache node 3.

Threshold Calculation Processing before Operation:

Each cache node 3 autonomously sets a threshold for a request rate for each content based on electric power information between nodes in a parent-child relationship on the delivery tree so that a sum of the electric power (cache allocation electric power) accompanied by the cache allocation and the electric power (traffic transfer electric power) accompanied by the content delivery is minimized.

Figure 4:
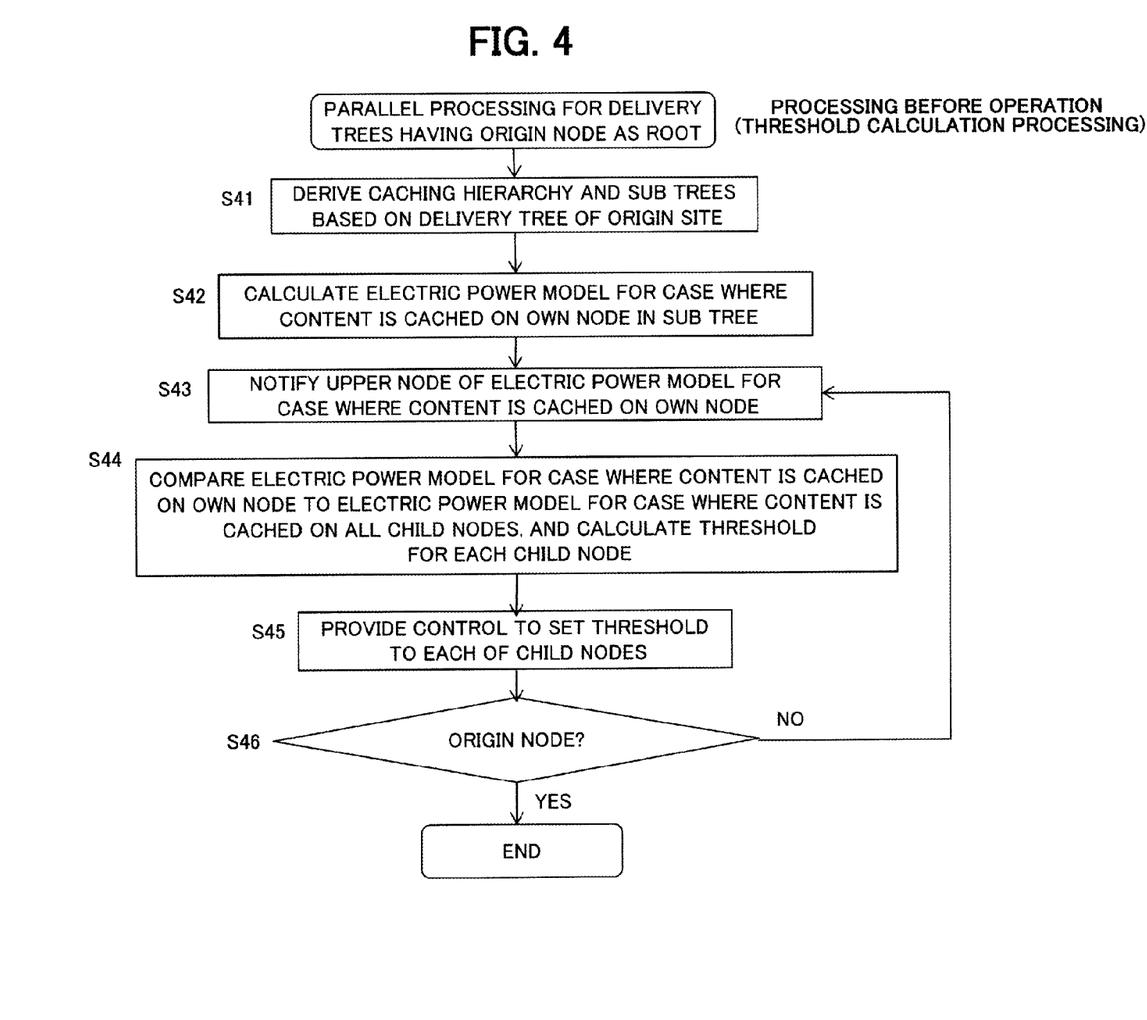
FIG. 4 is a flowchart illustrating threshold calculation processing before an operation according to the embodiment.

FIG. 4 illustrates in detail the threshold calculation processing before the operation. In the threshold calculation processing, the following processing is carried out in parallel with respect to delivery trees having an origin node as the root.

Figure 5:
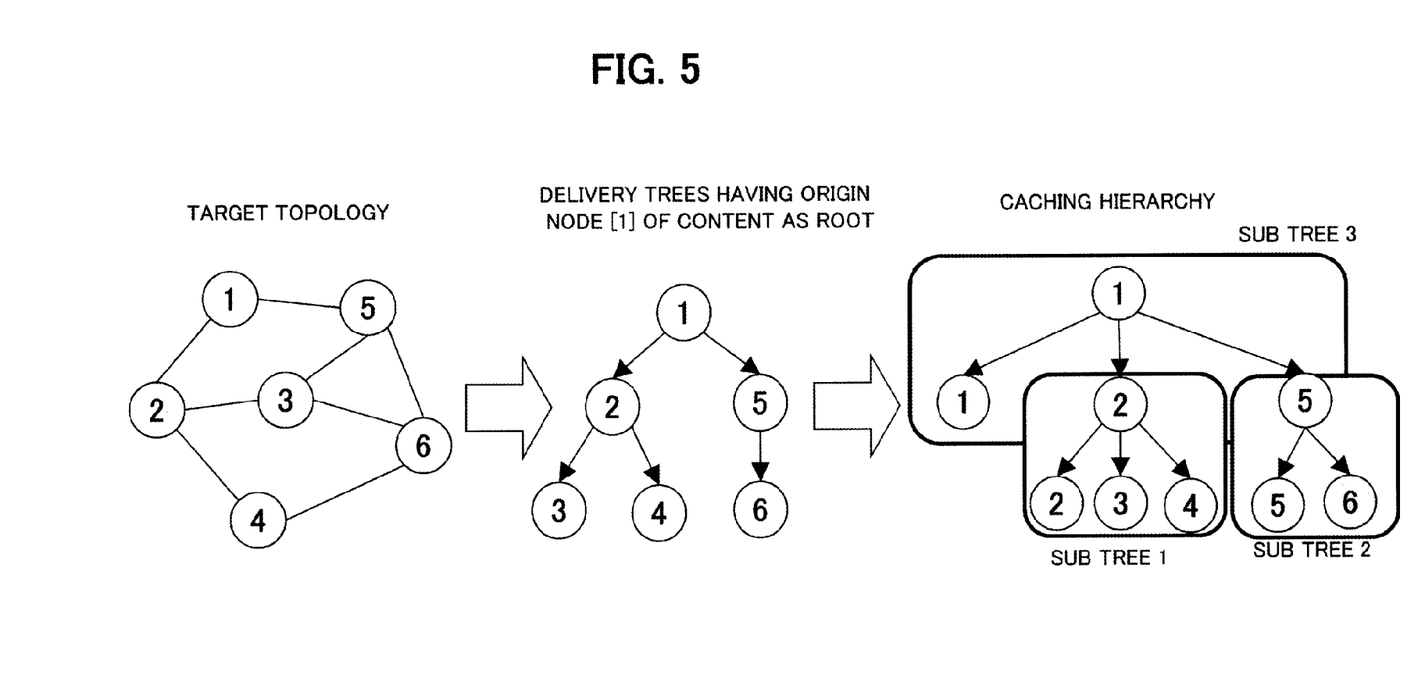
FIG. 5 is a diagram illustrating the threshold calculation processing before the operation according to the embodiment.

S41: A caching hierarchy and sub trees are derived based on the delivery tree having the origin site as a root. The sub tree management unit 37 acquires, from the delivery tree management unit 31, a cashing hierarchy, namely a relationship between each node and a child node existing directly below the node and possibly raising a content request to the node (notifying the node of the content request), thereby deriving logical sub tree structures in the parent-child relationship (refer to FIG. 5).

Figure 6:
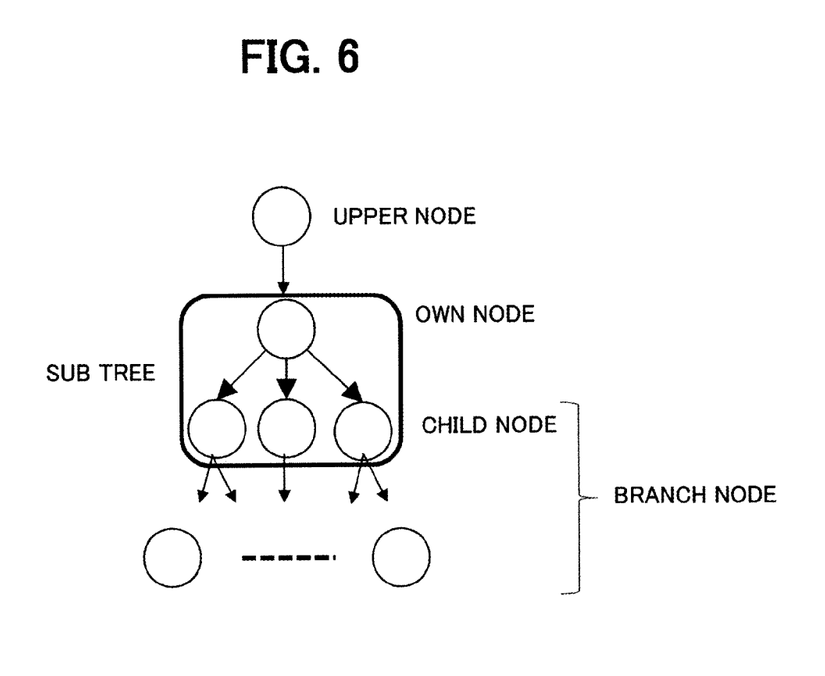
FIG. 6 is a diagram illustrating the threshold calculation processing before the operation according to the embodiment.

S42: An electric power model for a case where the content (content data in a strict sense) is cached on the own node in the sub tree is calculated. In other words, the electric power index management unit 38 calculates the electric power model for the case where the content is cached on the own node serving as a root of each sub tree based on an electric energy for a case where the content is cached on the own node and an electric energy for a case where the content having a content request rate $\lambda$ from each site is delivered from the own node to all child nodes and branch nodes on lower levels (refer to FIGS. 5 and 6).

$$\text{Power}_i^t(\lambda) = Ca_i + Tr_i(\lambda, H_i^t), \forall i$$

This electric power model is an electric power model calculated for each caching hierarchy having an origin site t as the root at a node i.

On this occasion, $Ca_i$ is an electric energy accompanied by the cache allocation, and $Tr_i$ is the traffic transfer electric power represented by the variable $\lambda$ for the content request rate from each site and a sum $H_i^t$ of hop lengths from the node i to a lower branch node thereof in the caching hierarchy.

Note that, the electric power model:

$$\text{Power}_i^t(\lambda_b^t)$$

can be represented as a first order expression ($a \times \lambda + b$).

S43: The electric power index management unit 38 notifies an upper node of the electric power model for the case where the content is cached on the own node (refer to FIG. 6).

Figure 7:
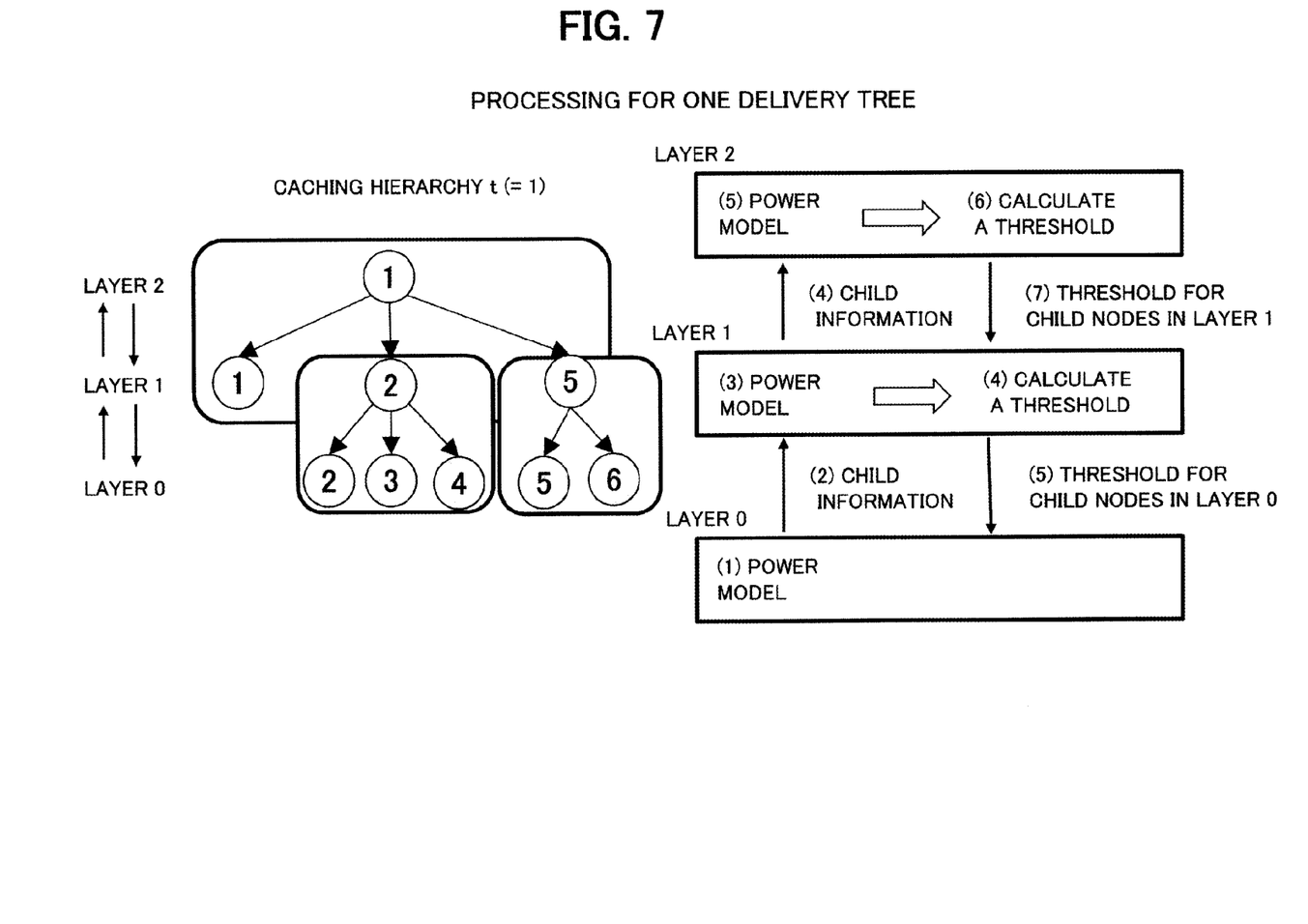
FIG. 7 is a diagram illustrating the threshold calculation processing before the operation according to the embodiment.

S44: The threshold for the request rate for each child node is calculated by comparing the electric power model for the case where the content is cached on the own node and an electric power model for a case where the content is cached on all child nodes (refer to FIG. 7). In other words, the threshold calculation unit 39 derives the following cache determination rule by comparing the electric power model on the own node and the electric power models collected from the child nodes.

If: the total electric energy for the case where the content is cached on the own node (=cache allocation electric power+traffic transfer electric power)>the total electric energy for the case where the content is cached on each of the child nodes (=cache allocation electric power+traffic transfer electric power) is satisfied, $$\text{Power}_i^t(\lambda_b^t) > \sum_{j \in C_i^t} \text{Power}_j^t(\lambda_b^t)$$

Then: the content is cached on the child nodes.

Else If: the total electric energy for the case where the content is cached on the own node≤the total electric energy for the case where the content is cached on each of the child nodes is satisfied, $$\text{Power}_i^t(\lambda_b^t) \le \sum_{j \in C_i^t} \text{Power}_j^t(\lambda_b^t)$$

Then: the content is cached on the own node or a node on the upper layer.

On this occasion, $C_i^t$ represents a set of child nodes of the node i on the caching hierarchy having the origin site t as the root.

Next, the threshold calculation unit 39 derives the variable λ (request rate from each site) satisfying the cache determination rule by using the following equations.

$$\text{Power}_i^t(\lambda_b^t) = \sum_{j \in C_i^t} \text{Power}_j^t(\lambda_b^t)$$

$$\lambda_b^t = \frac{(Cr_i^t - 1) \cdot D \cdot P_{ca}}{D \cdot (P_r + P_{wdm}) \cdot \left(H_i^t - \sum_{j \in C_i^t} H_j^t\right)}$$

As a result, the threshold for the request rate on a cache node j for a content having the origin site t is acquired as follows.

$$Th_j^t = Br_j^t \lambda_b^t$$

On this occasion, D represents a data size [bits], $Cr_i^t$ represents a total number of child nodes of the node i in the caching hierarchy having the origin site t as the root, $H_i^t$ represents a sum of hop lengths from the node i to a branch node in the caching hierarchy having the origin site t as the root, and $H_j^t$ represents a total number of branch nodes under the node j in the caching hierarchy having the origin site t as the root.

Further, Pr and Pwdm represent electric power parameters [W/bps=J/bit] accompanied by a router and a WDM device to transfer content data of 1 bit, and Pca represents an electric power parameter [W/bit=J/bit·sec] accompanied by a memory to cache content data of 1 bit.

S45: In processing of setting a threshold to a child node, the threshold setting unit 40 provides control to set, to the node j, the request rate threshold $Th_j^t$ at the child node j for a content having the origin site t, which is derived by the threshold calculation unit 39 of the node i.

S46: The threshold calculation processing in S44 and the threshold setting processing in S45 are carried out until the origin node is reached on the caching hierarchy, and are then finished.

Therefore, a cache determination rule for a content on each node to which the threshold is set is as follows. Specifically, a content having the origin site t which request rate to node i is above threshold $Th_i^t$ is cached in node j. On the other hand, a content which request rate to node i is equal to or less than the threshold $Th_i^t$ is not cached Cache Determination Processing during Operation:

A request rate is measured for each content, and it is determined whether or not to cache the content by comparing the measured request rate with the threshold on each cache node 3. The content which request rate is above the threshold is cached. Moreover, a content which request rate is equal to or less than the threshold is not cached.

Figure 8:
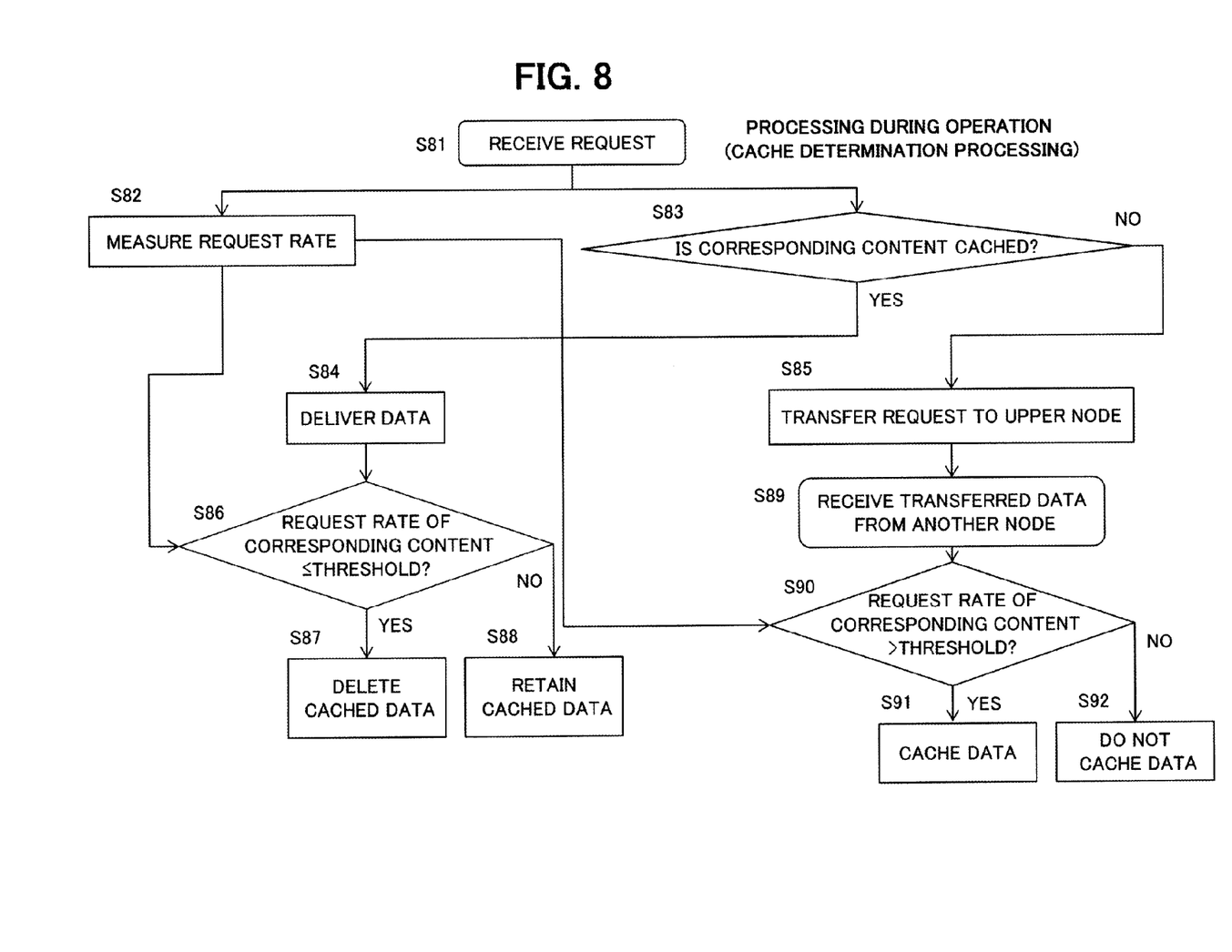
FIG. 8 is a flowchart illustrating cache determination processing during the operation according to the embodiment.

FIG. 8 illustrates in detail the cache determination processing during the operation.

S81: A request for a certain content is received in each node.

S82: The request rate measurement unit 41 estimates (measures) a request rate for the content corresponding to the content request.

S83: The cache determination unit 42 refers to the cache memory 36, thereby determining whether or not to cache the content corresponding to the content request on the own node.

S84 and S85: If the content is cached, the data transfer unit 34 delivers the content data from the own node to a child node in the caching hierarchy (S84). Moreover, if the content is not cached, the request transfer processing unit 32 transfers the request to an upper node in the caching hierarchy (S85).

S86, S87, and S88: In request rate determination processing for data deletion, the cache determination unit 42 identifies the origin site t of the content, and if the cache determination unit 42 determines that the request rate for the content measured in S82 is equal to or less than the threshold $Th_j^t$, the cached data is removed, and then the processing is finished. Moreover, if the cache determination unit 42 determines that the request rate for the content measured in S82 is more than the threshold $Th_j^t$, the cached data is cached, and then the processing is finished.

S89, S90, S91, and S92: In request rate determination processing for data caching, the cache determination unit 42 identifies the origin site t of the content, and if the cache determination unit 42 determines that the request rate for the content measured in S82 is more than the threshold $Th_j^t$ for the corresponding content data transferred from another node, the data is cached on the own node, and then the processing is finished. Moreover, if the cache determination unit 42 determines that the request rate for the content measured in S82 is equal to or less than the threshold $Th_j^t$ for the corresponding content data transferred from another node, the processing is finished without caching the data on the own node.

As described above, the autonomous distributed processing on each cache node 3 enables efficient cache determination in the autonomous distributed cache allocation control system 1.

[Effects Of Embodiment]

A description is now given of effects in the autonomous distributed cache allocation control system 1 according to the embodiment.

Evaluation conditions are set as follows.

Figure 9:
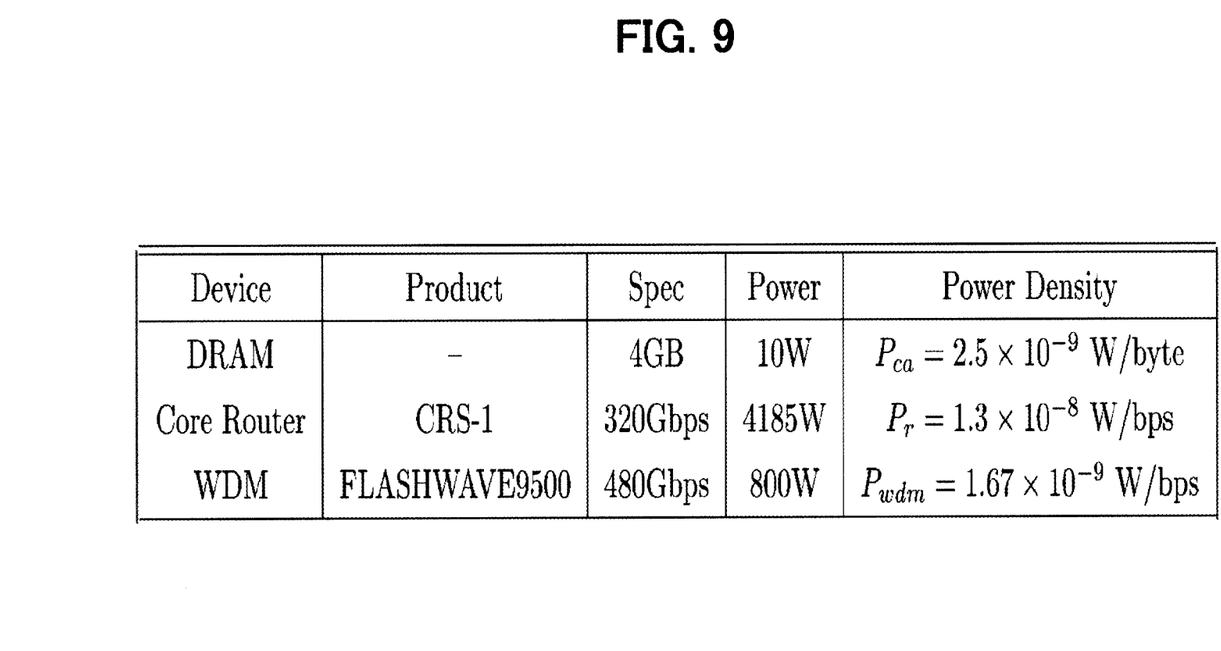
FIG. 9 is a diagram illustrating an effect of the embodiment.
Figure 10:
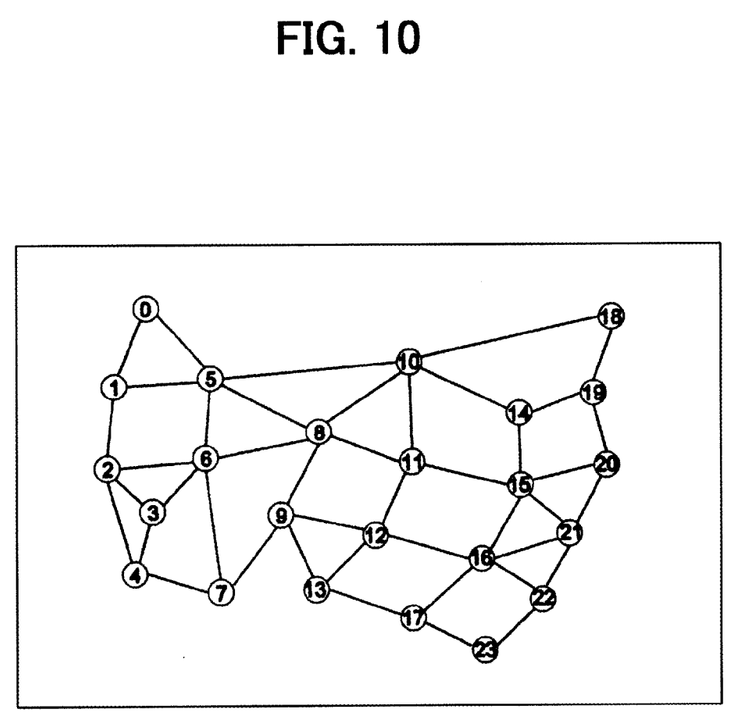
FIG. 10 is a diagram illustrating an effect of the embodiment.

(1) Electric power characteristics (refer to FIG. 9)
(2) Target network: 24 nodes in a topology illustrated in FIG. 10
(3) The number of contents: 10,000
(4) Origin site of each content: Set following a uniform distribution
(5) Content size: Set following a geometric distribution. An average content size is 10 megabytes
(6) Fixed partition size (chunk size) of content: 10 kilobytes
(7) Amount of requests generated from each site: 100 requests/second
(8) Distribution of amount of requests for content: Set following a Zipf (α=1.2) distribution
(9) Request generation distribution: Set following Poisson distribution
(10) Simulation period: 7,200 seconds Moreover, effects of the present disclosed technology (threshold-based caching) are compared to the following two technologies.

A first technology is an optimal cache allocation (optimal caching) where content caching is applied only at cache allocation locations optimally designed using content information (request distribution) on an entire network.

A second technology is the general LFU (Pure LFU) where contents are discarded starting from a content having the lowest popularity if memory usage overflows the limited memory size.

Figure 11:
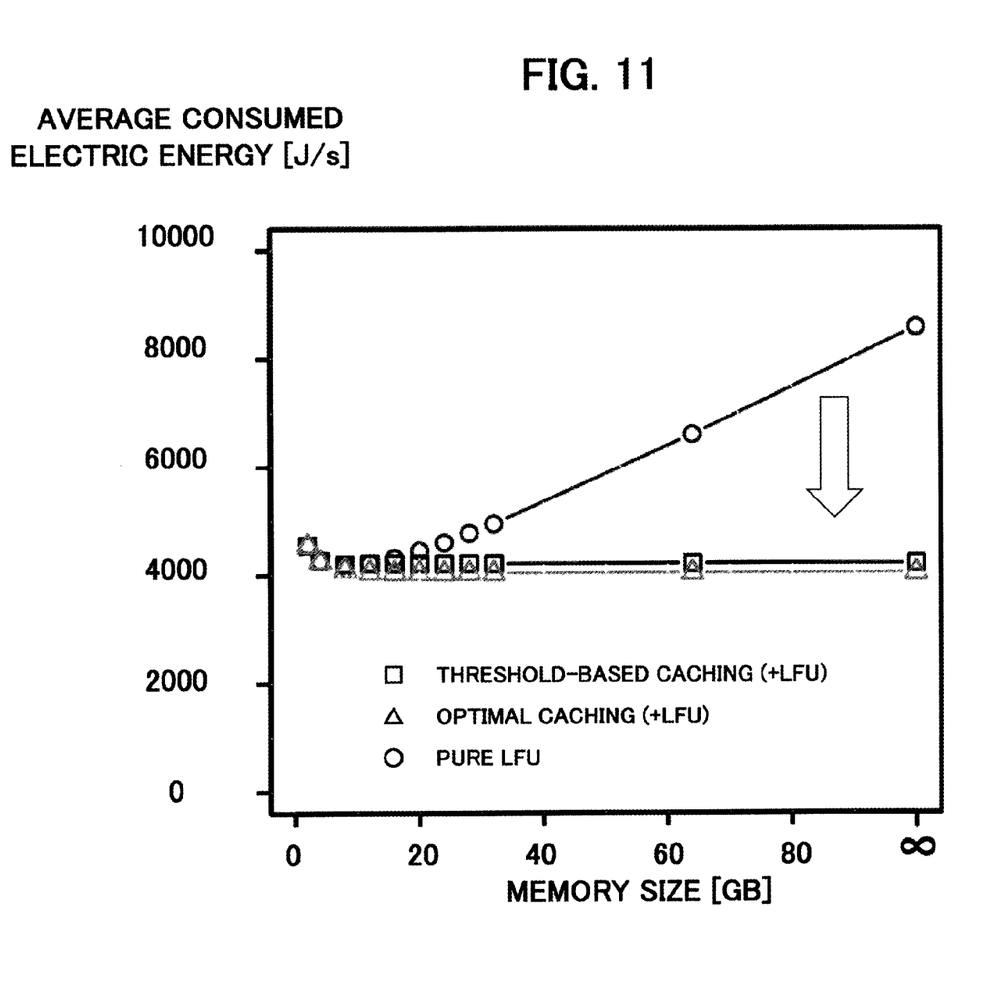
FIG. 11 is a graph showing an effect of the embodiment.
Figure 12:
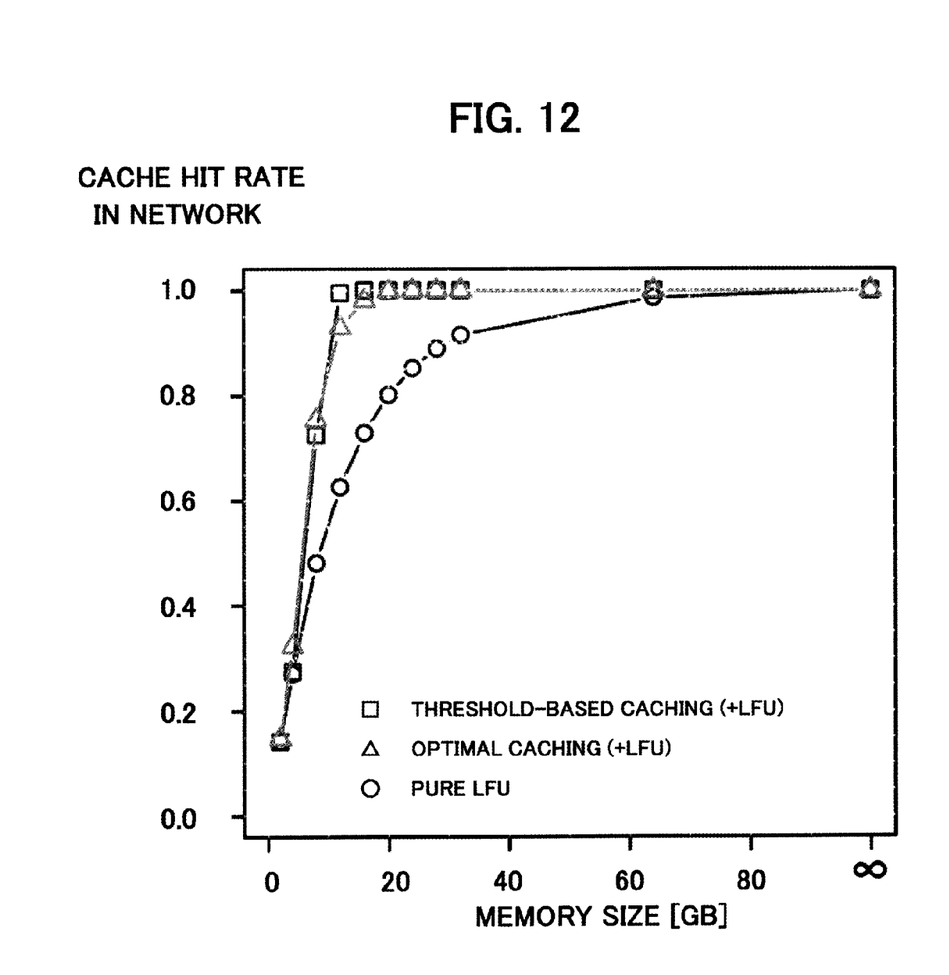
FIG. 12 is a graph showing an effect of the embodiment.

As evaluation results, an average consumed electric energy of the entire network is shown in FIG. 11, and a cache hit rate representing a hit of a request on a cache node in the network is shown in FIG. 12 while an upper limit of a memory size on each cache node is changed.

As appreciated from FIG. 11, the present disclosed technology that uses the local information provides an electric power saving effect close to that provided by the optimal cache allocation technology that uses the content information (request distribution) on the entire network. On the other hand, the LFU technology uses the installed memory as much as possible, and hence the electric energy accompanied by the cache allocation is dominant, and the average entire consumed electric energy is large compared to the other technologies.

Moreover, as appreciated from FIG. 12, the present disclosed technology achieves a performance almost equivalent to that of a cache hit rate by the optimal cache allocation technology that uses the information on the entire network. On the other hand, with the general LFU technology, the memory cannot be efficiently used, and the cache hit rate is lower than the other technologies.

Thus, the present disclosed technology assuming the autonomous distributed processing by the node can realize almost optimal cache allocation without managing the entire content information. Moreover, the electric power saving effect and the cache hit rate performance can be increased by improving efficiency of a memory usage as compared to the general LFU technology.

The disclosed node can carry out an appropriate cache allocation on a network in consideration of both the electric power accompanied by the cache allocation and the traffic transfer electric power accompanied by the content delivery.

Modified Example

The processing of the embodiment described above is provided as a computer-executable program, and can be provided by a non-transitory computer readable recording medium such as a CD-ROM or a flexible disk or via a communication line.

An arbitrary plurality of or all the processes of the embodiment described above can be selected and combined to be carried out.

What is claimed is:

1. A node constructing an electric power saving network and including a cache function for a delivered content, the node comprising a memory storing executable instructions; and a processor connected to the memory and configured to execute the instructions, execution of the instructions causes the processor to:
    derive, based on a delivery tree for a content, a logical sub tree structure including a first layer node and a plurality of second layer nodes lower than the first layer node;
    calculate first electric power information used for caching the content in the first layer node in the sub tree structure;
    compare the first electric power information to second electric power information calculated and notified by the plurality of second layer nodes lower than the first layer node in the sub tree structure and used for caching the content in the plurality of second layer nodes, then calculate a threshold for a content request rate for each of the plurality of second layer nodes, wherein the content request rate indicates amount of deliver request of the content;
    provide control to set the calculated threshold to the plurality of second layer nodes lower than the first layer node; and
    determine possibility of a cache allocation of the content by comparing a measured content request rate with the threshold.

2. The node according to claim 1, wherein the first electric power information and the second electric power information comprise a first electric energy and a second electric energy acquired from an electric power accompanied by the cache allocation and a traffic transfer electric power accompanied by a content delivery.

3. The node according to claim 2, wherein the processor is further configured to:
    define, based on a comparison between the first electric energy and the second electric energy, a determination condition for the cache allocation on one of the first layer node and the plurality of second layer nodes;
    calculate a variable for the content request rate satisfying the determination condition for the cache allocation; and
    calculate, from the calculated variable, the threshold for the content request rate.

4. The node according to claim 1, wherein the delivery tree includes an origin site of the content as a root.

5. A cache allocation control method executed by a processor in a node constructing an electric power saving network and including a cache function for a delivered content, the method comprising:
    deriving, based on a delivery tree for a content, a logical sub tree structure including a first layer node and a plurality of second layer nodes lower than the first layer node;
    calculating first electric power information used for caching the content in the first layer node in the sub tree structure;
    comparing the first electric power information to second electric power information calculated and notified by the plurality of second layer nodes lower than the first layer node in the sub tree structure and used for caching the content in the plurality of second layer nodes, then calculating a threshold for a content request rate for each of the plurality of second layer nodes, wherein the content request rate indicates amount of deliver request of the content;
    providing control to set the calculated threshold to the plurality of second layer nodes lower than the first layer node; and
    determining possibility of a cache allocation of the content by comparing a measured content request rate with the threshold.

6. A non-transitory readable recording medium, which is recorded with a program executed by a processor in a node constructing an electric power saving network and including a cache function for a delivered content, the program comprising:
    deriving, based on a delivery tree for a content, a logical sub tree structure including a first layer node and a plurality of second layer nodes lower than the first layer node;
    calculating first electric power information used for caching the content in the first layer node in the sub tree structure;

comparing the first electric power information to second electric power information calculated and notified by the plurality of second layer nodes lower than the first layer node in the sub tree structure and used for caching the content in the plurality of second layer nodes, then calculating a threshold for a content request rate for each of the plurality of second layer nodes, wherein the content request rate indicates amount of deliver request of the content;

providing control to set the calculated threshold to the plurality of second layer nodes lower than the first layer node; and determining possibility of a cache allocation of the content by comparing a measured content request rate with the threshold.

* * * * *